Patented Apr. 21, 1925.

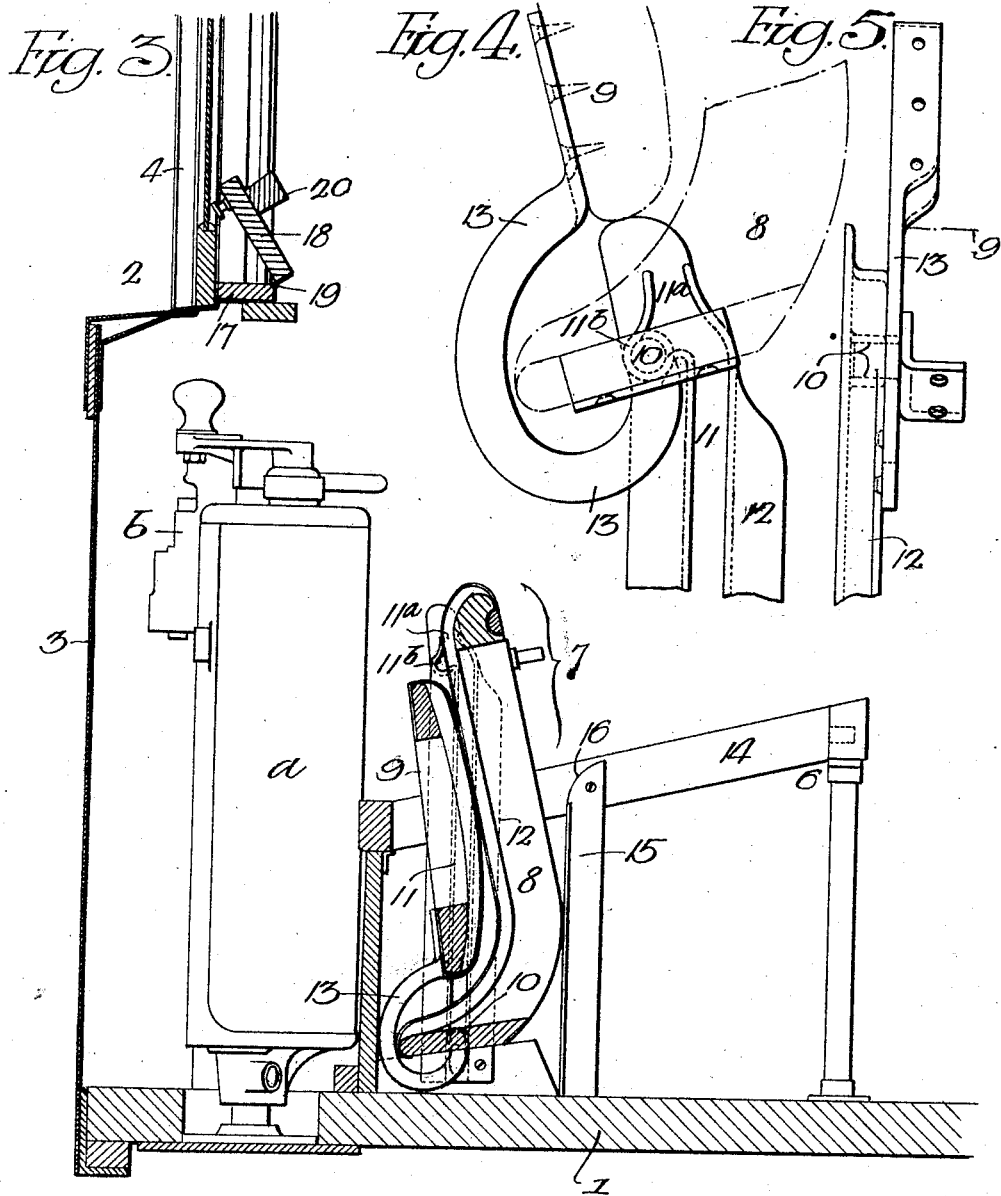

1,534,837

UNITED STATES PATENT OFFICE.

JAMES A. BROOKS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR SEAT.

Application filed April 26, 1924. Serial No. 709,174.

*To all whom it may concern:*

Be it known that I, JAMES A. BROOKS, a citizen of the United States, residing at Philadelphia, Pennsylvania, have invented certain Improvements in Car Seats, of which the following is a specification.

This invention relates to certain improvements in seat structures of what are known as "single end passenger cars". These cars are equipped with emergency controlling mechanism at the rear end, in addition to the controlling mechanism at the forward end of the car.

One object of the invention is to construct the seat at the rear of the car so that, under normal conditions, the emergency controller is enclosed within the seat structure. When it is necessary to use the controller, the seat structure can be collapsed to expose the upper portion of the controller and to furnish a space for the operator.

A further object of the invention is to design the seat structure so that the entire structure can be removed when the controller requires repairs.

In the accompanying drawings:

Fig. 3 is a sectional view, similar to Fig. 2, with the exception that the seat structure is folded; and Figs. 4 and 5 are enlarged views illustrating the seat hinge and the slideways.

Figure 1:
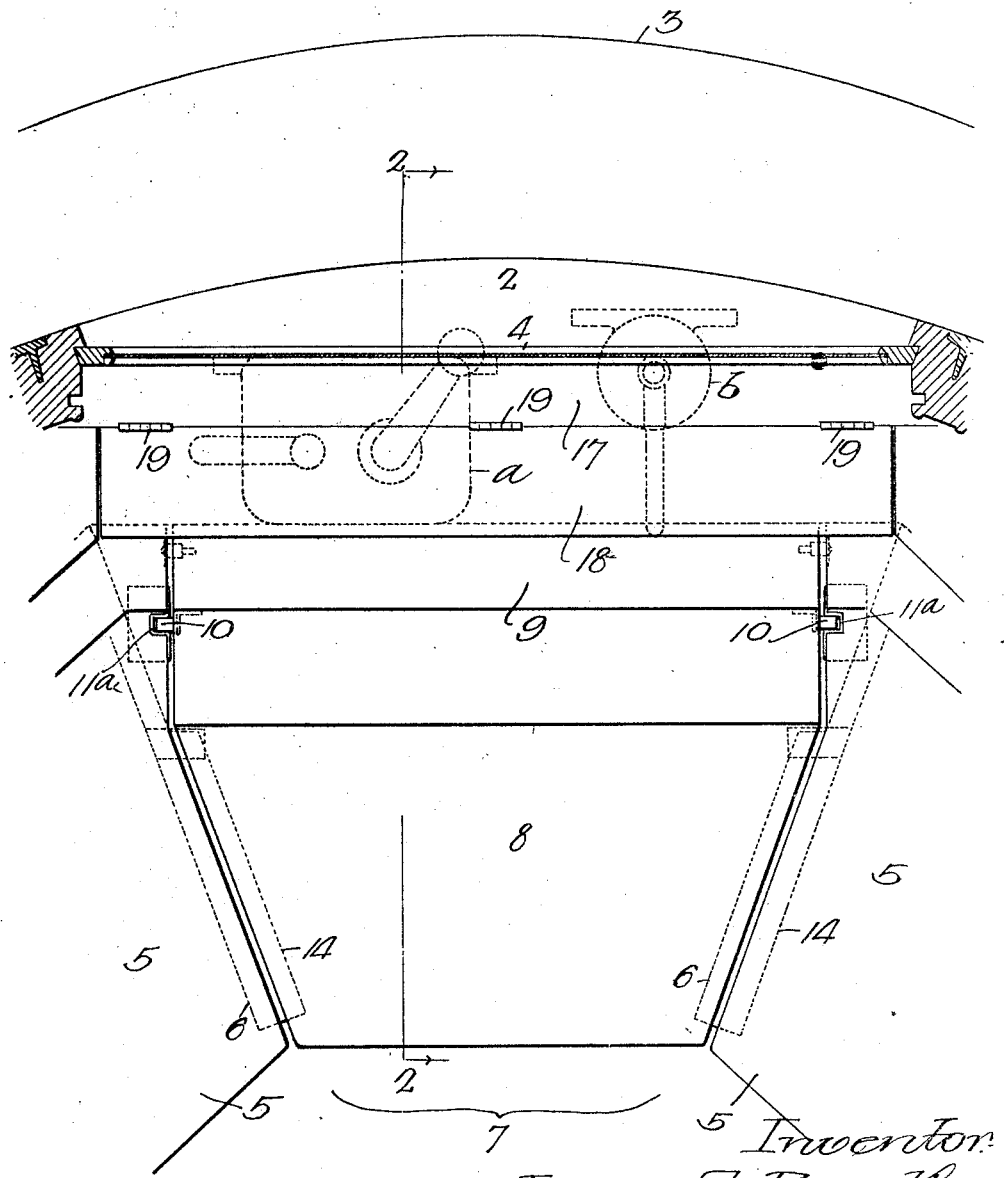
Fig. 1 is a plan view of sufficient of the rear end of a car of the above type to illustrate my invention.

Referring to the drawings, 1 is the floor of a car. 2 is the rear end having a panel 3 and a sash section 4. 5, 5 are permanent seats at the rear end of the car. These seats are supported on suitable frames 6. 7 is the movable seat structure, which is located between the two permanent seats 5, 5. This seat structure has a cushion section 8 and a back section 9. The back section can be turned down to the position shown by dotted lines in Fig. 2. The cushion section 8 has laterally extending pintles 10 at each side, near the rear. These pintles are adapted to ways 11 in vertical guides 12, which are secured to the permanent seat sections 5, 5, as shown clearly in Fig. 2. At the upper end of each guide, the way 11 is offset, as shown at 11ª, Fig. 4. Directly below this offset is a socket 11ᵇ. When the seat section is in its normal position, as in Fig. 2, the pintles 10 are in the sockets 11ᵇ. By raising the rear of the seat section and allowing the pintles to enter the main ways 11, the seat can be collapsed and lowered to the position shown in Fig. 3.

When it is desired to remove the seat section, it can be raised to allow the pintles 10 to pass out through the open way 11ª. Brackets 13 are secured to the lower edge of the back section 9, and are mounted on the pintles 10 between the cushion section and the guides, as shown clearly in Figs. 4 and 5. The brackets are so formed that the cushion can be turned down from the position shown by full lines in Fig. 2 to that shown by dotted lines in said figure. When the cushion section is lowered to the position shown in Fig. 3, the back section is carried with it and assumes the position shown in said figure.

Figure 2:
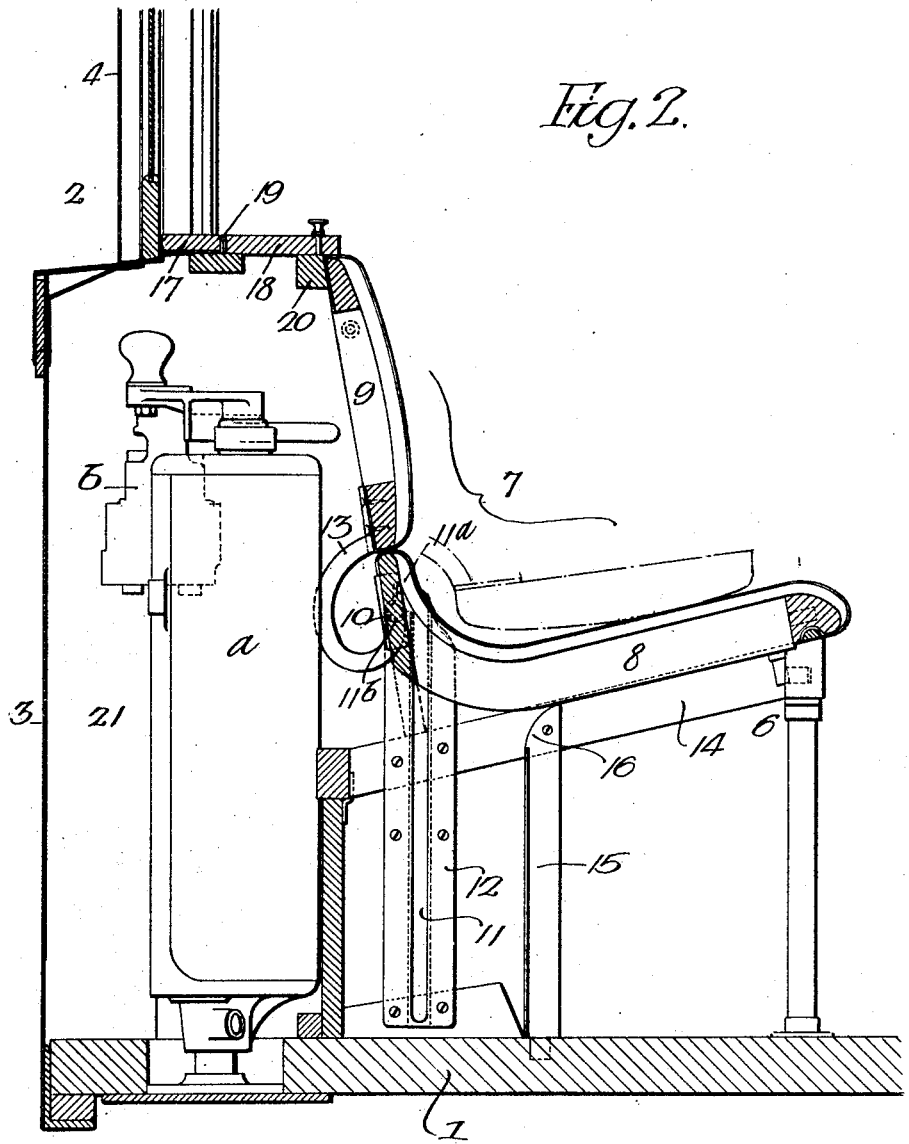
Fig. 2 is a sectional elevation on the line 2—2, Fig. 1.

The rails 14 of the frame 6 at the end of each of the permanent seat sections 5 extend beyond the edges of said seats and support the cushion section 8 of the movable seat structure, when in the position shown in Fig. 2.

The vertical guide rails 15 are rounded at 16 and are in alignment with the rails 14, acting as guides for the cushion section 8 when turned from the position shown in Fig. 2 to that shown in Fig. 3.

The permanent sills 17 at the rear end of the car form part of the enclosure for the controller *a*. The movable section 18 of the sill is hinged at 19 to the fixed section. This movable section has a strip 20, which forms the support for the back 9 of the movable section. The movable section 18 of the sill overlaps this back section, making a neat appearance.

The controller *a*, as well as the brake mechanism *b*, is located in the compartment 21, back of the movable section 7. When it is desired to gain access to the controller, the movable section 18 of the sill is thrown back to the position shown in Fig. 3, the back section is turned down onto the cushion section of the seat, and the rear of the seat section is drawn forward to allow the pintles 10 to be moved out of the sockets 11ᵇ and into the vertical ways 11. This exposes the controller *a*, as well as the brake mechanism *b*. The operator can stand in the space between the two permanent seat sections 5.

I claim:

1. The combination in a car, of a seat structure having a cushion section and a movable back section, said seat enclosing a compartment at the end of the car; and a controller in the compartment, the back section of the seat structure being movable to expose the upper portion of the controller.

2. The combination in a car, of two permanent seats spaced apart at the rear of the car; a movable seat structure located between the two permanent sections; a compartment back of the movable seat structure; and a controller located in the compartment, said movable seat structure having a pivoted back arranged to be turned down upon the cushion section of the seat structure, the seat structure when in its normal position entirely enclosing the controller, said seat structure being arranged to be moved to expose the controller.

3. The combination of a single end car having a closed back; a compartment at the back; a controller in said compartment; and a seat structure having a pivoted back closing the compartment, said back being arranged to be turned down onto the cushion section of the said seat structure to expose the upper portion of the controller.

4. The combination of a single end car having a closed back and a compartment; a controller in the compartment; guides having vertical ways therein and sockets; and a seat section having pintles located normally in the sockets and arranged to slide in the ways when the seat section is moved to expose the controller.

5. The combination of a car having a closed back and a compartment; a controller in the compartment; two permanent seat sections spaced apart, the space being in front of the compartment; a movable seat structure having a pivoted cushion section and a pivoted back; and vertical guides having ways for the seat structure so that the seat structure can be turned on its pivots and lowered into the ways to expose the controller, which is located in the compartment.

6. The combination in a car having a closed back and a compartment at the back; a controller in the compartment; a pivoted seat structure arranged to enclose or expose the controller, said seat structure having a cushion section and a back section; and two vertical guides for the seat structure, said guides having ways open at the top and each having a socket; the cushion section of the seat structure provided with pintles adapted to the ways in the guides and resting normally in the sockets, the back section of the seat structure being pivotally mounted in the pintles and arranged to be turned down into the cushion section to expose the controller.

7. The combination in a single end car, of permanent seat sections spaced apart and forming an open space; a pivotally mounted seat structure closing said space; a compartment having a controller back of the pivotally mounted seat structure, the back section of the seat structure being pivotally mounted so as to be turned down onto the cushion section; a pivoted sill engaging the upper end of the back section; and guides for the seat structure so that it can be lowered to expose the controller within the compartment.

8. The combination in a car having a closed back and a compartment at the back; a controller in the compartment; a movable seat structure in front of the controller and forming an enclosure for the compartment, said seat structure having a cushion section and a back section mounted on the same pivots; and guides for the pivots of the seat structure, said guides having sockets at their upper end to retain the sections of the seat structure in their normal position, said seat structure being bodily removable from the guides to entirely expose the controller.

JAMES A. BROOKS.